United States Patent [19]

Cooke

[11] 4,325,246

[45] Apr. 20, 1982

[54] COMPASS CHECKER

[75] Inventor: Gordon R. Cooke, Poway, Calif.

[73] Assignee: The United States of America as represented by the Secretary of the Navy, Washington, D.C.

[21] Appl. No.: 268,601

[22] Filed: May 29, 1981

[51] Int. Cl.³ .............................................. G01C 25/00
[52] U.S. Cl. .................................................... 73/1 E
[58] Field of Search ........................................ 73/1 E

[56] References Cited

U.S. PATENT DOCUMENTS

| 517,029 | 3/1894 | Clausen | 73/1 E |
|---|---|---|---|
| 2,887,873 | 5/1959 | Halpern et al. | 73/1 E |
| 3,522,723 | 8/1970 | Baker et al. | 73/1 E |

Primary Examiner—S. Clement Swisher

Attorney, Agent, or Firm—Richard S. Sciascia; Ervin F. Johnston; Harvey Fendelman

[57] ABSTRACT

A device is disclosed for generating a rotatable magnetic field for calibrating a compass. The field generated overcomes the earth's magnetic field and any other nearby magnetic field. A U-shaped housing has a first calibrated dial on the top horizontal member and a dial on the bottom horizontal member. The dials are mechanically linked to rotate in unison. Each dial contains a pair of bar magnets. The compass to be tested is positioned within the interior of the U-shaped housing. An adjustment knob is provided for turning the top and bottom dials and thereby permitting orientation of the four magnets within a range of 360°. The accuracy of the compass can thereby be tested.

12 Claims, 5 Drawing Figures

COMPASS CHECKER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to the field of measuring and testing and more specifically, to the calibration and testing of compasses. Still more specifically, the present invention relates to a mechanism for rotating a compass card which is positioned inside a towed sonar array.

In the past, sonar towed arrays have utilized magnetic compasses to provide an indication of array heading. Such arrays typically comprise a length of PVC tubing which serves as a housing for hydrophone arrays and for several magnetic compasses. The compasses are electrically connected to a monitor system at a remote location where the headings of array modules are displayed. In the past, no method of testing the accuracy of the remote monitor's indication of the array compass heading was possible.

SUMMARY OF THE INVENTION

Accordingly, the present invention relates to a device that is used to generate a rotatable magnetic field which overcomes the earth's magnetic field and any other nearby magnetic field. This rotatable magnetic field is used to swing a compass card inside of an electronics module housed inside a portion of a towed array sonar system. By utilization of the present invention, a means of testing the compass module for operation and accuracy without removing it from its housing is provided.

The present invention may be used to identify and record any variation of a compass output which may occur due to a misalignment of the module inside the towed array. The magnetic field generated by the present invention can be uniformly rotated around the array and is stronger than any earth's or ship's hull field into the compass module. The unit is portable and constructed of nonmagnetic material and can be easily placed over the compass module location on the outside of the array. The present invention can be easily employed under adverse and environmental conditions and at the same time provide the reliable means to test a compass module. The present invention enables better accuracy, permits coupling historical data, and is far less expensive than opening a towed array compass module for testing. Further, the present invention is unsensitive to ship's magnetic fields, unsensitive to the earth's magnetic field and enables quick replacement of faulty modules prior to deployment.

OBJECTS OF THE INVENTION

Accordingly, it is the primary object of the present invention to disclose a device for inducing a rotatable magnetic field.

It is a further object of the present invention to disclose a device for testing the internal alignment of a compass of a towed array sonar system.

It is a further object of the present invention to disclose a compass test set that enables testing the accuracy of a towed array sonar compass without requiring disassembly of the towed array.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 5 is a schematic diagram of the magnetic fields induced by the present invention.

DESCRIPTION OF THE PREFERRED EMBODIMENT

Figure 1:
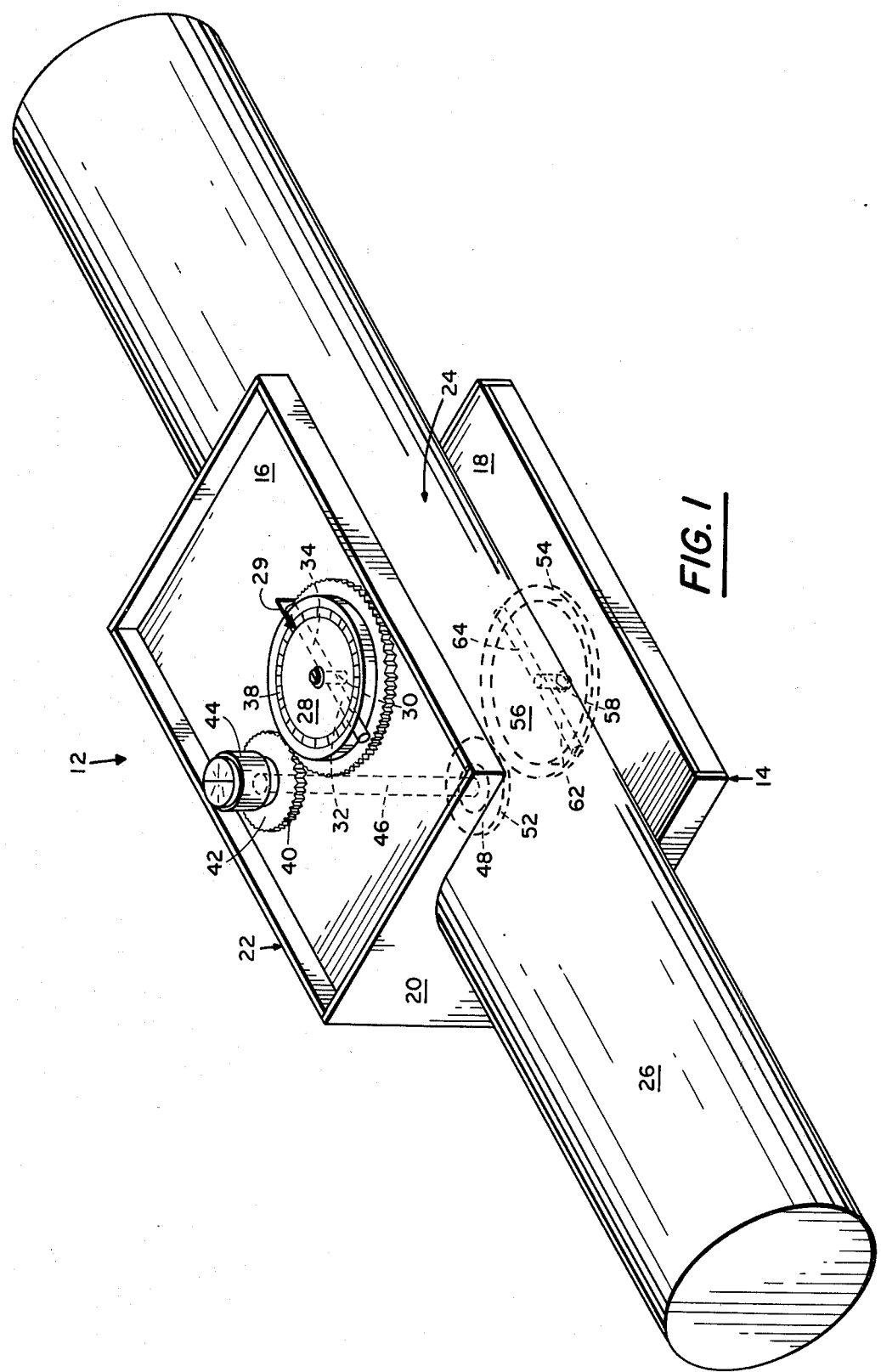
FIG. 1 is an isometric view of the compass tester of the present invention.

Referring now to FIGS. 1-4, the compass test set 12 of the present invention will now be described. The compass test set 12 comprises a generally U-shaped housing 14. The housing 14 has a top horizontal wall 16, a bottom horizontal wall 18, sidewalls 20 and a rear wall 22. The walls of the device 12 are fitted together so as to form a channel 24 between the top wall 16 and bottom wall 18. The channel 24, in the preferred embodiment of the present invention, is designed such that the device 12 will fit over a cylindrical type towed array such as 26 illustrated by way of example in FIG. 1. The housing 14 is preferably made of a plastic type material and the walls previously described preferably are hollow in order to reduce the weight of the device.

Mounted on the horizontal top wall 16 is a first rotatable calibrated dial 28. Also mounted in a fixed position is a pointer 29 which intersects the readout of the dial. The calibrated dial 28 is rotatably secured to the top wall members 16 by pivot pin 30. Embedded within the dial 28 or positioned within channels formed within the dial 28 is a pair of bar magnets 32 and 34 with their poles oriented so that the opposite poles of each of the magnets 32 and 34 are adjacent each other. Annular sleeve 36 is fitted between the dial 28 and the head of pivot pin 30. At the periphery of the dial 28 there are formed gear teeth 38 which mesh with the gear teeth 40 of the drive gear 42. Drive gear 42 is manipulated by control knob 44 which is connected to it by connecting rod 46. Connecting rod 46 extends through the top wall 16 in front of the back wall 22 and is secured to a second drive gear 48 in the bottom wall 18 of the tester 12. Drive gear 48 is secured in position by sleeve 50 which may be pressed fit or affixed by any other suitable means. Gear teeth 52 of drive gear 48 mesh with the gear teeth 54 of the second rotatable dial 56 positioned in the lower wall 18. The rotatable dial 56 rotates about pivot pin 58 which secures the dial 56 via sleeve 60. Embedded within the dial 56 is a second pair of bar magnets 62 and 64 with their poles oriented in the same direction as the poles of the bar magnets 32 and 34.

Figure 2:
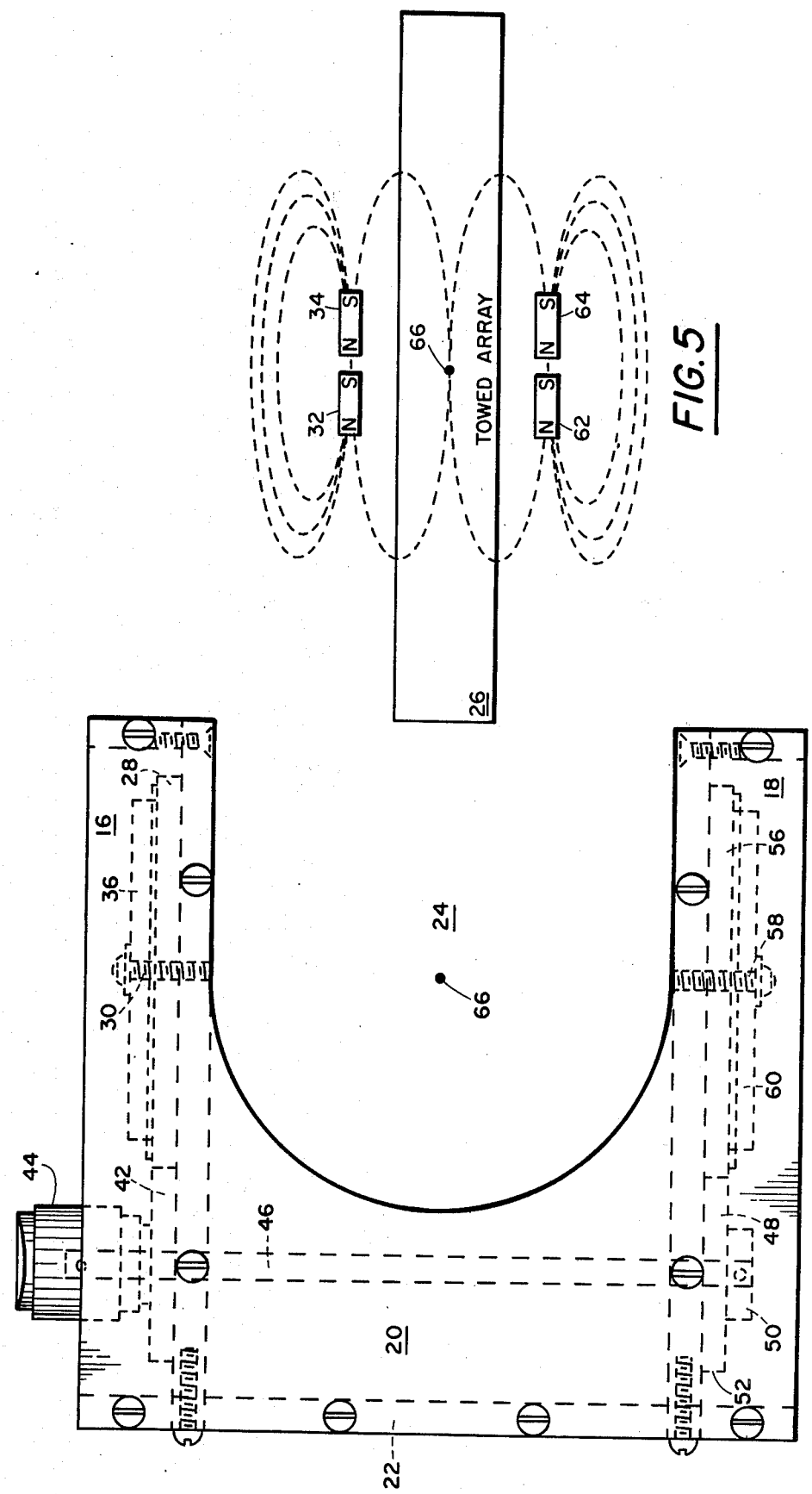
FIG. 2 is a side view of the compass tester of the present invention.
Figure 3:
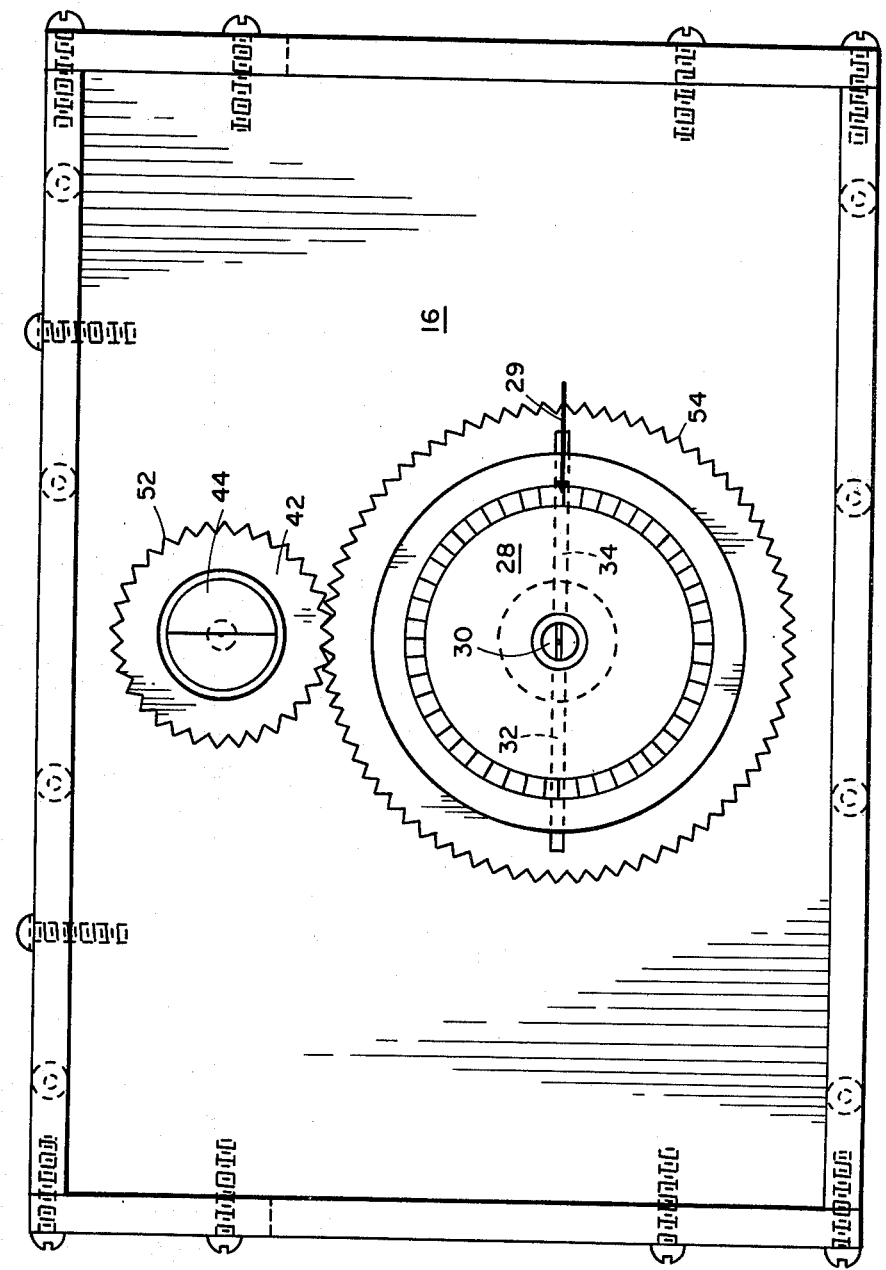
FIG. 3 is a top view of the compass tester of the present invention.
Figure 4:
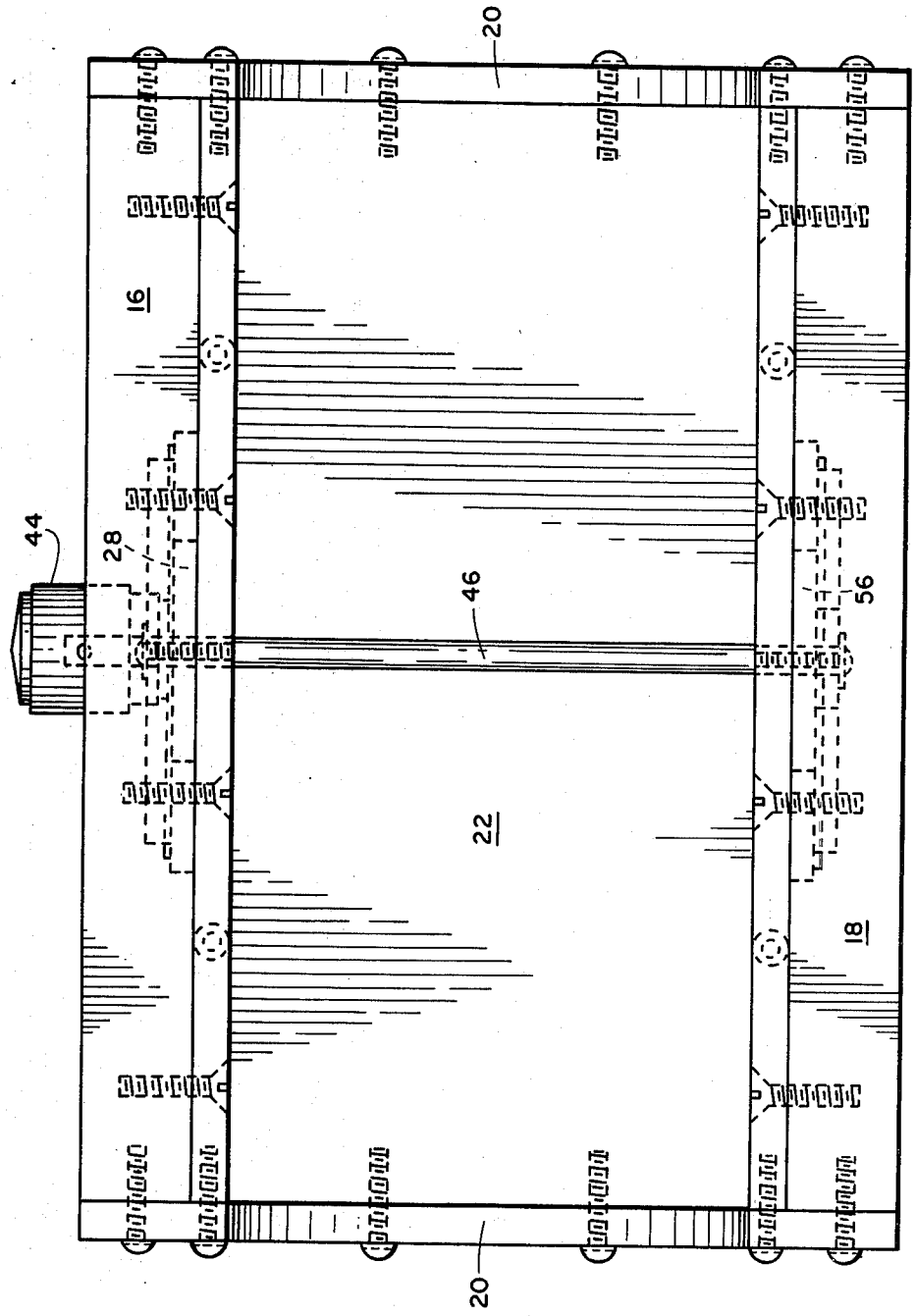
FIG. 4 is a front view of the compass tester of the present invention.

In the preferred utilization of the present invention the magnets 32, 34, 62 and 64 are made of sabarium cobalt and are perfectly aligned with each other such they are parallel and so as to maximize the strength of the magnetic field generated by those magnets and to maximize the strength of the magnetic fields from the aforesaid magnets converging at point 66 illustrated in FIG. 2. It is to be understood, however, that the dial 28 and 56 may be formed in a two piece construction such that the portion securing the bar magnets is separately rotatable from the portion containing the gear teeth of the dial. In this manner, the bar magnets 32 and 34 may be aligned separately and differently from the orientation of the bar magnets 62 and 64. It should be readily apparent from the aforegoing description and the illustrations of FIGS. 1-4 that rotation of the control knob 44 will result in ganged rotation of the dials 28 and 56. By so rotating the control knob 44 the position of the bar magnets 32, 34, 62 and 64 may be moved to any orientation within a 360 degree radius.

Referring to FIG. 5 there is illustrated a schematic representation of the magnetic fields generated by the bar magnets 32, 34, 62 and 64. It is seen that the magnetic fields converge at the point 66 within the channel 24. It is at point 66 that the compass card of the towed array 26 is intended to be positioned.

Typically, the device 12 is employed during the initial employment of a towed array to test the compass modules for operation and/or variation in readings. The unit 12 is placed over the array 26 which, for example, is laid on a steel deck on the back of a ship. The compass electronics of the towed array 26 are typically connected via normal connections to readout electronics located at a remote location usually in the sonar instrument area of the ship. Technicians talking via the ship's intercom can thus ascertain that the compass card of the towed array 26 follows the field generated by the compass tester 12 and that it displays via readout electronics the same heading induced by the tester. Variations are recorded if present and added or substrated to future readings in order to properly calibrate the compass card.

Obviously, many other modifications and variations of the present invention are possible in the light of the above teachings. It is therefore to be understood that within the scope of the appended claims the invention may be practiced otherwise than as specifically described.

What is claimed is:

1. A device for generating a rotatable magnetic field comprising:
   a housing having first and second walls and a channel therebetween;
   a first magnetic means secured to said first wall for generating a first magnetic field in the area of said channel; and
   a second magnetic means secured to said second wall for generating a second magnetic field in the area of said channel.

2. The device of claim 1 wherein:
   said housing comprises a generally U-shaped housing.

3. The device of claim 1 wherein said first and second magnetic means are rotatably secured to said first and second walls, respectively.

4. The device of claims 1, 2, or 3 wherein said first and second walls are substantially parallel.

5. The device of claim 4 wherein:
   said first magnetic means comprises a first dial rotatably secured to said first wall and a first pair of bar magnets secured to said first dial; and
   said second magnetic means comprises a second dial rotatably secured to said second wall and a second pair of bar magnets secured to said second dial.

6. The device of claim 5 wherein said first magnetic field is additive to said second magnetic field in the area of said channel.

7. The device of claim 5 wherein said housing is plastic.

8. The device of claim 5 further comprising:
   a first derive drive gear rotatably secured to said first wall and being in engagement with said first dial;
   a connecting rod attached to said first drive gear;
   a second drive gear rotatably secured to said second wall and being attached to said connecting rod and engaged with said second dial whereby said first and second drive gears rotate in unison.

9. The device of claim 8 wherein said connecting rod is stainless steel.

10. The device of claim 9 wherein said first dial is calibrated.

11. The device of claim 10 further comprising:
    an adjustment knob connected to said first drive gear.

12. The device of claim 8 wherein:
    said first and second dials each have gear teeth for engagement with said first and second drive gears, respectively.

* * * * *